Sept. 7, 1965  R. MOORE, JR  3,204,524
REAR VISION MIRROR HAVING PUSH BUTTON CONTROL PRE-SET POSITIONS
Filed Oct. 30, 1961  2 Sheets-Sheet 1
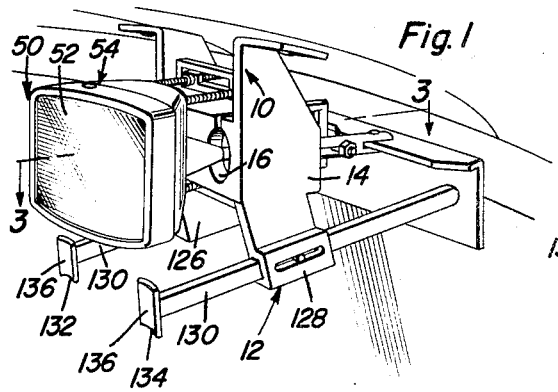
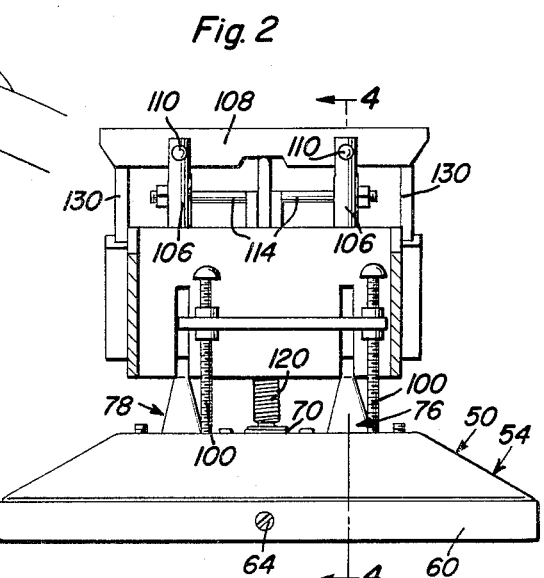
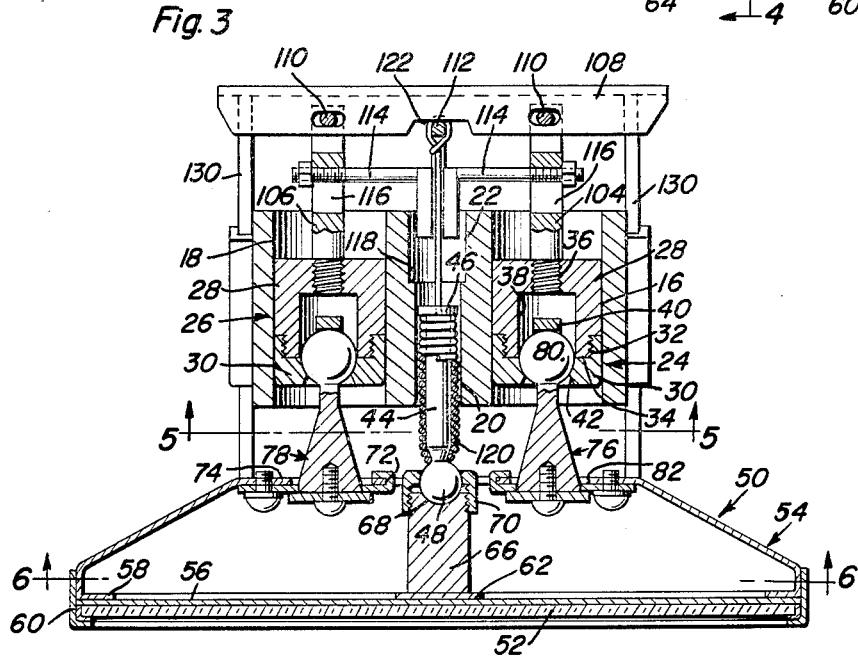
Roland Moore, Jr.
INVENTOR.

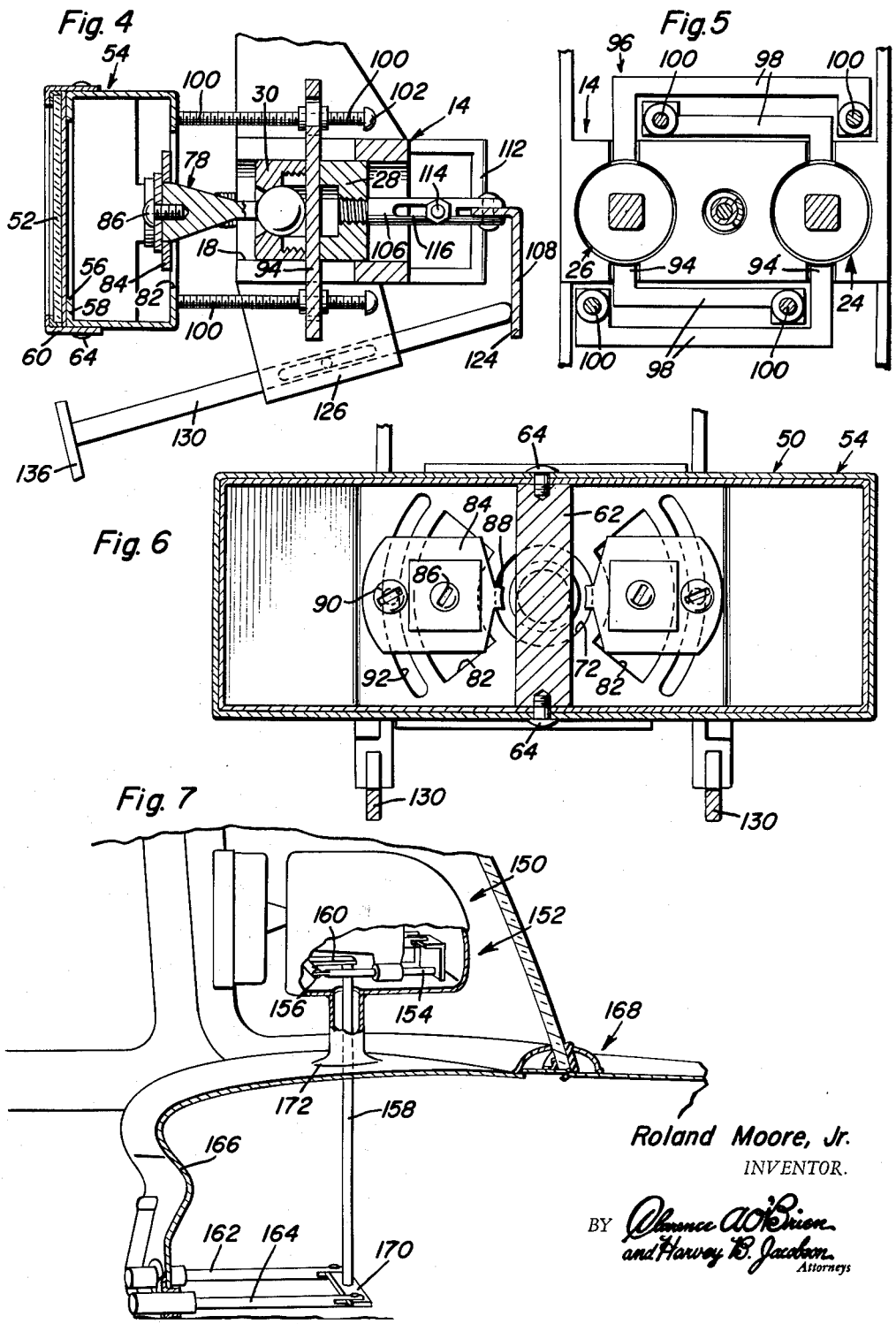

United States Patent Office

3,204,524
Patented Sept. 7, 1965

3,204,524
REAR VISION MIRROR HAVING PUSH BUTTON
CONTROL PRE-SET POSITIONS
Roland Moore, Jr., 13427 Coleen, Warren, Mich.
Filed Oct. 30, 1961, Ser. No. 148,597
4 Claims. (Cl. 88—98)

This invention relates to a novel and useful rear vision mirror having push button controlled pre-set positions and more specifically to a push button controlled rear vision mirror adapted for use in vehicles.

In many instances, two persons such as a man and his wife quite frequently alternately drive the same family vehicle. As most husbands and wives are of different height and require different positioning of the driver's seat of the vehicle, in most instances each time a man and his wife alternate in driving the family vehicle the rear vision mirror must be readjusted.

While it may seem a small task to have to readjust the rear vision mirror of a vehicle each time it is driven, this is not necessarily the case. Quite frequently the driver of a vehicle has to lean forward in the driver's seat each time he wishes to readjust the positioning of the rear vision mirror inasmuch as the rear vision mirror is spaced a considerable distance forwardly of the driver's seat. In addition, the driver of a vehicle is not always exactly sure as to the manner in which the driver's seat is adjusted and quite often after adjusting the mirror for his normal seating position in the driver's seat, the driver will change the positioning of the driver's seat in the vehicle thereby necessitating that the positioning of the rear vision mirror again be changed.

Accordingly, it is the main object of this invention to provide a rear vision mirror constructed in a manner whereby it is provided with push button controlled pre-set positions which are adjustable. In this manner, a rear vision mirror constructed in accordance with the present invention may be provided with a pair of push buttons, one for a man and one for his wife, and the positioning of the rear vision mirror effected by manipulating each push button may be adjusted so that each time a push button of the rear vision mirror is manipulated the mirror assembly thereof will be moved to a pre-set position. In this manner, the driver of a vehicle may position himself on the driver's seat and manipulate the corresponding push button control. Then, if the rear vision mirror is in fact properly adjusted for his seated position, he may then proceed to drive the vehicle without being hampered by a rear vision mirror which is not properly adjusted. However, if the adjustment effected by the push button is not correct for the position in which the driver is seated, the driver may check his position relative to the seat and if his positioning relative to the seat is correct he may then check the adjusted position of the seat relative to the vehicle. Accordingly, it will be seen that a rear vision mirror constructed in accordance with the preceding object will greatly facilitate proper positioning of the rear vision mirror for a particular driver.

A further object of this invention, in accordance with the preceding object, is to provide a rear vision mirror having push button controlled pre-set positions which may be constructed in a manner so as to be adapted for overhead mounting above the windshield as well as mounting from the dashboard of the vehicle.

A final object to be specifically enumerated herein is to provide a rear vision mirror in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the rear vision mirror of the instant invention shown mounted adjacent the windshield of a vehicle;

FIGURE 2 is a top plan view of the mirror assembly illustrated in FIGURE 1 with parts thereof being broken away and shown in section;

FIGURE 3 is an enlarged horizontal sectional view taken substantially upon the plane indicated by section line 3—3 of FIGURE 1;

FIGURE 4 is an enlarged vertical sectional view taken substantially upon the plane indicated by section line 4—4 of FIGURE 2;

FIGURE 5 is a fragmentary vertical sectional view taken substantially upon the plane indicated by section line 5—5 of FIGURE 3;

FIGURE 6 is a vertical sectional view taken substantially upon a plane indicated by section line 6—6 of FIGURE 3; and FIGURE 7 is a perspective view of a modified form of rear vision mirror shown mounted on the dashboard of a vehicle, parts of the vehicle and rear vision mirror being broken away and shown in section.

Referring now more specifically to the drawings, the numeral 10 generally designates the rear vision mirror of the instant invention. The rear vision mirror 10 includes a mount generally referred to by the reference numeral 12 and it will be noted that the mount 12 includes a body portion 14 having a pair of bores 16 and 18 formed therethrough. A third bore 20 is formed in the body portion 14 intermediate the bores 16 and 18 and it will be noted that the bores 16, 18 and 20 are substantially parallel. In addition, one end of the bore 20 is provided with a counterbore 22.

Piston means in the form of piston assemblies generally referred to by the reference numerals 24 and 26 are frictionally and slidably disposed in the bores 16 and 18 respectively and it will be noted that each piston assembly includes a body portion 28 and a head portion 30. Each head portion 30 includes a blind threaded bore 32 in which the externally threaded neck portion 34 of the associated body portion 28 is threadedly engaged. Each neck portion 34 includes a threaded bore 36 having a counterbore 38 formed at one end thereof. Diametrically aligned openings 40 are formed in each body portion 38 to communicate with the counterbore 38 thereof. It will be noted that each head portion 30 includes an axial opening 42 and that the inner end of the opening 42 is semi-spherical.

A support shaft 44 has an enlarged end portion 46 which is slidably disposed in the bore 20 and the remote end of the shaft 44 has a spherical member 48 formed thereon.

A mirror assembly generally referred to by the reference numeral 50 includes a mirror element 52. It will be noted that the mirror assembly includes a generally rectangular and hollow housing generally referred to by reference numeral 54 and that the hollow housing 54 has an opening 56 formed in its front wall 58. The mirror element is secured in overlying relation to the opening 56 by means of a closure cover 60 and the closure cover 60 may be secured to the housing 54 in any convenient manner such as by a friction fit.

A support flange, see FIGURE 6 is secured across the opening 56 and the support flange 62 is secured to the housing 54 at its opposite end by means of fasteners 64.

A mounting stud 66 has one end secured to the flange or strap 62 in any convenient manner and the other end thereof is provided with a semi-spherical recess 68 in which the spherical member 48 is held captive by means of an apertured retaining cap 70 that is threadedly engaged with the free end of the mounting stud 66. In this manner, the mirror assembly 50 is swivelly mounted on the end of the shaft 44 on which the spherical member 48 is formed.

The retaining cap 70 is received in a centrally disposed opening 72 formed in the rear wall 74 of the housing 54 and it will be noted that a pair of elongated pull members generally referred to by the reference numerals 76 and 78 are provided with spherical members 80 on one end which is held captive in the corresponding axial opening in a manner which will hereinafter be more fully set forth. The other end of each of the pull members 76 and 78 is received through an arcuate slot 82 formed in the rear wall 74 and secured therethrough by means of a retaining plate 84 which is secured over the corresponding slot 82 by means of a fastener 86. Each of the retaining plates 84 is provided with a tab portion 88 disposed through the opening 72 and a setsscrew 90 which is secured therethrough and through a corresponding arcuate slot 92 also formed in the rear wall 74. Accordingly, it may be seen that the pull members 76 and 78 support the housing 54 from the body portion 14 of the mount 12 and that the housing 54 may be pivotally adjusted about an axis generally coincidental with the longitudinal axis of the support shaft 44 by adjustable positioning of the retaining plates 84 relative to the rear wall 74.

With attention now directed to FIGURES 3 and 5 of the drawings it will be seen that a transverse support element 94 which is elongated is received through each pair of diametrically opposite openings 40 and is held against longitudinal shifting relative to the associated piston means by means of frictional engagement of the corresponding spherical member 80.

Each of the support elements 94 comprises the bight portion of a generally U-shaped support member referred to in general by the reference numeral 96 and including a pair of generally parallel leg portions 98. The free end of each of the leg portions 98 has an abutment screw 100 threadedly engaged therewith which generally parallels the bores 16, 18 and 20 and each end of the abutment screws 100 has an end remote from its headed end 102 which is adapted for abutting engagement with the rear wall 74 of the housing 54, see FIGURES 2 and 4.

From FIGURE 5 of the drawings it will be noted that the abutment screws supported from the piston assembly 24 are disposed on the side of the shaft 44 remote from the piston assembly 44 and that the abutment screws 100 supported from the piston assembly 26 are disposed on the side of the shaft 44 remote from the piston assembly 26.

With attention again directed to FIGURE 3 of the drawings it will be seen that a pair of connecting links 104 and 106 are threadedly engaged at one end with the base portions of the piston assemblies 24 and 26 respectively and that they are secured to a cross head shaft 108 at their opposite ends by means of pin and slot connections 110. The intermediate portion of the cross-head shaft 108 abuts against a generally horizontally disposed U-shaped support member 112 and thus the cross-head shaft 108 is rockably mounted and interconnects the piston assemblies 24 and 26 for inverse movement relative to the mount 12.

L-shaped abutment arms 114 each have one end secured to a corresponding link and extends through the slot 16 formed therein. The remote end of each of the L-shaped arms 114 is laterally directed and is loosely and slidably received in the counterbore 22. The free ends of the L-shaped arms 114 are thus disposed for engagement with the shoulder 118 defined between the bore 20 and the counterbore 22 to limit movement of the links 104 and 106.

One end of an expansion spring 120 is secured to the shaft 44 immediately adjacent the spherical member 48 and the other end thereof is straightened and is secured about a support member 112 as at 122. Thus, it will be seen that the shaft 44 is mounted for limited movement toward and away from the body portion 14 of the mount 12 and that it is normally resiliently urged toward the body portion 14.

The cross-head shaft or plate 108 includes a downturned portion 124 which projects below the body portion 14 and it will be noted that the mount 12 includes a pair of sleeve-like members or portions 126 and 128 through which the shank portions 130 of push buttons 132 and 134 are slidably received. The ends of the shanks 130 remote from the enlarged heads 136 of the push buttons 134 are disposed for abutting engagement with the depending portion 124 of the crosshead shaft or plate 108 and thus it will be noted that the push buttons 132 and 134 may be pushed in turn to effect rocking movement of the crosshead shaft 108 whereby the piston assemblies 24 and 26 will be reciprocated in the bores 18 and 16 respectively. Inasmuch as the spring 120 maintains the shaft 44 within the bore 20 and against longitudinal shifting relative to the body portion 14 excepting when excessive axial forces are applied to the shaft 44 a rearward pull on the link 104 will pivot the assembly 50 in a counterclockwise direction about the center of the spherical member 48 as seen in FIGURE 3 and therefore also cause the left end of the assembly 50 to exert a forward pull on the piston assembly 26 through the pull member 78.

As the piston assembly 24 is moved away from the crosshead shaft or plate 108, the corresponding pair of abutment screws 100 will move forwardly and engage the rear wall 74 on the side of the housing 54 to which the pull member 78 is secured. Accordingly, a pull member 78 may be utilized to pull the corresponding side of the housing 54 toward a body portion 14 whereas the abutment screws 100 on the same side of the housing 54 are being moved away from the body portion 14. Accordingly, the spaced engagement of these abutment screws with the rear wall 74 of the housing 54 and the swivel connection of the housing 54 with the shaft 44 establishes three-point support for the housing 54 thereby establishing one set position of the mirror assembly 50 relative to the body portion 14. Of course, forward movement of the piston assembly 26 will likewise accurately position the mirror assembly 50 to the pre-set position defined by the other pair of abutment screws 100.

If it is desired to change the position of the mirror assembly 50 afforded by engagement of one pair of the abutment screws 100 with the mirror assembly 50, the abutment screws 100 may be adjusted as desired.

With attention now directed to FIGURE 7 of the drawings it will be seen a modified form of mirror assembly generally referred to by the reference numeral 150. The mirror assembly 150 is substantially identical to the rear vision mirror 10 with the exception being that it is enclosed in a housing 152. The housing 152 encloses the body portion of the mirror assembly 150 and instead of push buttons 132 and 134, only a pair of shank portions 154 are provided. However, the ends of the shank portions 154 remote from the corresponding crosshead plate are interconnected by means of a cross shaft 156 which is in turn connected to a pivot shaft 158 by means of an arm 160. A pair of push button shafts 162 and 164 are slidably disposed through the dashboard 166 of the vehicle 168 and are connected to the other end of the pivot shaft 158 by means of a crosshead assembly 170. The housing 152 is supported from the dash as at 172, thus it may be seen that the push button shafts 162 and 164 may be actuated in a manner similar to the push buttons 132 and 134 to adjust the mirror assembly 150.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rear vision mirror having a pre-set position, said mirror comprising a mount, support means on said mount, a mirror assembly including a mirror element, means swivelly supporting said mirror assembly from said support means for universal movement about a point substantially stationarily positioned relative to said support means and with said assembly disposed outwardly of one side of said mount and extending transversely of a straight line path disposed generally normal to said mirror element and passing through said point, a pair of guide members each including a pair of abutment members, said guide members being mounted on said mount for frictionally resisted inverse rectilinear movement generally paralleling said path and with the abutment members of each guide member disposed for engagement with said assembly from one side thereof and from remote sides of said path, the abutment members of each pair of abutment members being spaced circumferentially about said path, means interconnecting said guide members and said mirror assembly and operable to shift the portions of said mirror assembly disposed on said remote sides of said path inversely relative to the corresponding abutment members in response to shifting of said guide members.

2. The combination of claim 1 wherein said mount includes a pair of bores generally paralleling said path, said guide members each comprising piston means frictionally and slidably received in the corresponding bore.

3. The combination of claim 1 wherein said means swivelly supporting said assembly from said support means also includes means rotatably supporting said assembly for frictionally resisted rotation about an axis generally coinciding with said path.

4. The combination of claim 1 wherein said means interconnecting said guide members and said mirror assembly comprise a pair of elongated pull members secured at one pair of corresponding ends to said guide members by means of a swivel connection and at the other pair of corresponding ends to said portions of said mirror assembly.

References Cited by the Examiner
UNITED STATES PATENTS

| 2,504,386 | 4/50 | Brady et al. | 88—98 |
| 2,504,387 | 4/50 | Pruellage | 88—98 |
| 2,805,600 | 9/57 | Miller | 88—98 |
| 2,873,647 | 2/59 | Bach | 88—93 |

JEWELL H. PEDERSEN, *Primary Examiner.*

JULIA E. COINER, *Examiner.*